UNITED STATES PATENT OFFICE.

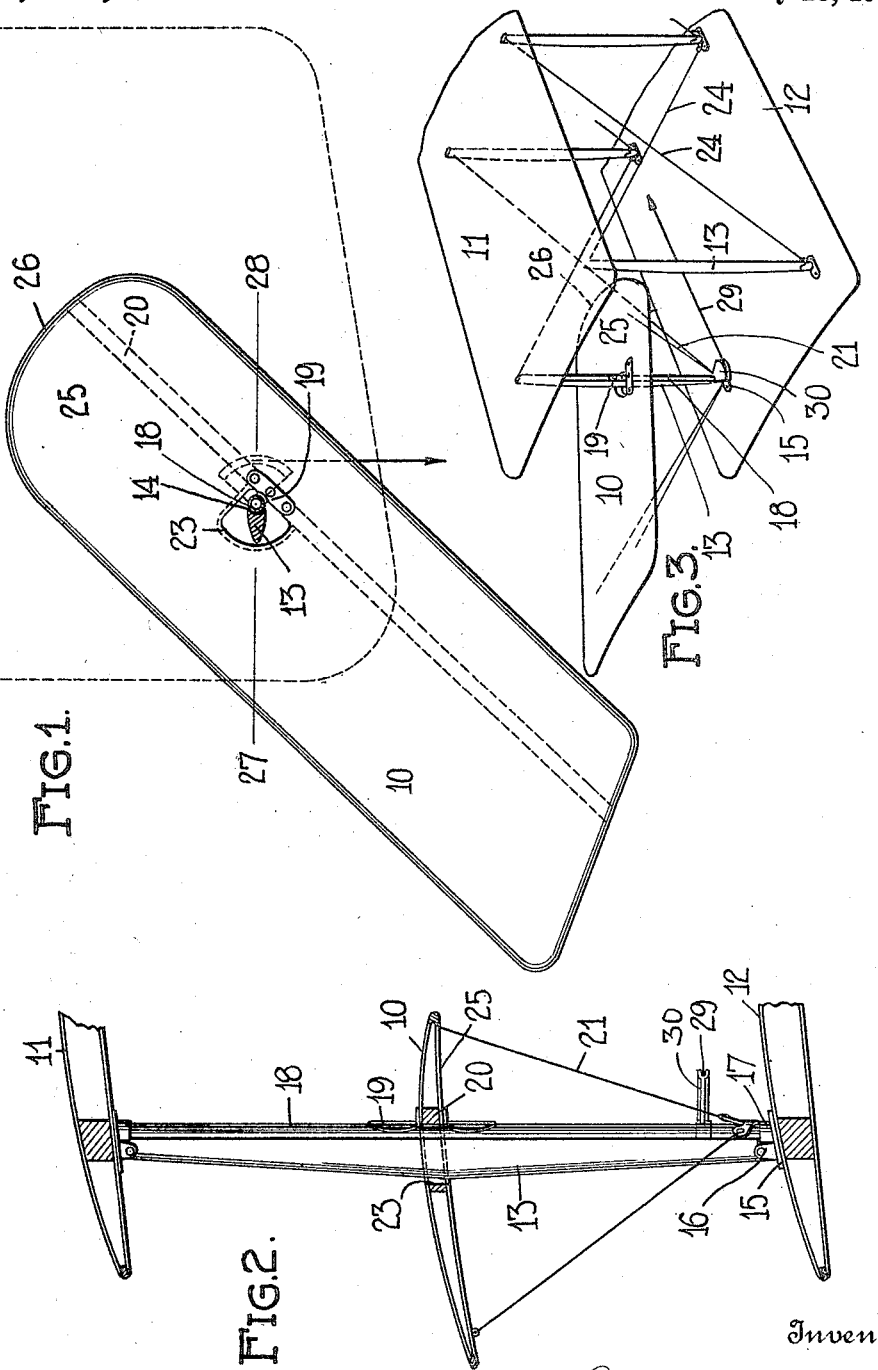

JOHN P. TARBOX, OF GARDEN CITY, NEW YORK, ASSIGNOR TO TARBOX SAFETY AIRCRAFT COMPANY, A CORPORATION OF DELAWARE.

VERTICAL-AXIS AILERON.

1,423,167.   Specification of Letters Patent.   Patented July 18, 1922.

Application filed June 20, 1918. Serial No. 240,983.

*To all whom it may concern:*

Be it known that I, JOHN P. TARBOX, a citizen of the United States, residing at Garden City, in the county of Nassau and State of New York, have invented certain new and useful Improvements in Vertical-Axis Ailerons, of which the following is a specification.

My invention relates to ailerons of the vertical axis type disclosed in my issued Patent No. 1,239,636, Sept. 11, 1917. Its object is the production of an aileron structure of this type mechanically and aerodynamically suited for application to aeroplanes of present day types, particularly the biplane type. The accompanying drawings show one embodiment of my invention, but it should be understood at the outset that it is capable of several embodiments without departing in any wise from its generic spirit.

Of the drawings;

Fig. 1 is a plan view,

Fig. 2 a sectional side elevation, and

Fig. 3 a three-quarter front perspective view from a point slightly above the wings of an aeroplane to which the aileron is attached.

Fig. 3 clearly shows the aileron in its relation to the wings of an aeroplane. The aileron proper is designated 10 and the upper and lower wings respectively 11 and 12. They are spaced apart by the usual interwing struts 13 and wiring 24 after the Pratt trussing system. One of the outer struts 13, in this case the rear strut, I make of incomplete streamline section as shown in the plan view of Fig. 1. The section is that of the central and rear portions of the commonly known forms of streamline section, the nose portion being cut away and a concave recess 14 formed in the front of the strut. Its ends are connected to the wing fittings 15 by socket devices 16 of any usual form. In the usual case this strut is under compression.

Also mounted on the fittings 15 are ball axial and thrust bearings 17, or the equivalent, of any approved form. These support the vertical aileron axes 18 of such diameter and in such position with respect to the strut 13 that it acts as a leading edge for the strut throughout its entire length, being in effect nested within the concave 14. Speaking in terms of section as shown in the plan view in Fig. 1, the axis 18 forms the nose of the section and completes the streamline form.

Supported from this axis intermediate its ends and in this case approximately at its middle, is the aileron 10. Appropriate fixtures 19 welded or otherwise secured to the axis and bolted or otherwise secured to the main beam 20 of the aileron constitute a primary connection of the aileron with the axis. Secondary connections are the bracing cables 21 connecting the leading and trailing edges of the aileron with the lower end of the axis to assist in taking the lift strains. These may be in any suitable number. Similar load cables may connect the aileron with the upper end of the axis if desired. The axis 14 and strut 13 pierce through the body of aileron 10, and aperture 23 being provided to permit free oscillation of the aileron about its axis. Normally the aileron lies in the horizontal plane passing approximately through the points of intersection of the trussing wires 24 so that the movement of the inner end 25 of the aileron is not interfered with by the wiring. This inner end is convexly curved as at 26 to further reduce danger of fouling in case the aileron is of large size, and it may indeed be formed upon a radius about axis 18. The outer end is cut obliquely on a line extending in the general direction of flight and it may in a given instance be cut parallel to the line of flight.

The aerofoil section of the aileron on a line 27—28 parallel to the line of flight and cutting it obliquely is made the section of maximum efficiency so that the aileron lifts at maximum efficiency, that is, a section of maximum lift over drift when the aileron is in normal position. When moved from that position the effect of the section is altered. Operation is by means of a controlling cable 29 connecting with a sector 30 rigidly connected with the oscillatable axis 18. Obviously any other means of operating may be used. Obviously, also, the section of the aileron may be made according to the form of any known aerofoil section. Further, sections of maximum lift over drift ratio are not necessarily used. Any others may be used. The efficiency may be maximum in positions other than that heretofore specified. In other words it may be less when the aileron is in normal position than when it is in the abnormal position. It is my intention to utilize any or all of these arrangements.

I claim:

1. In an airplane, a vertically extending strut of streamlined section, and a vertical axis aileron having an axis streamlined by said strut.

2. In an airplane, a strut and a vertical axis aileron having a movable axis parallel to and coextensive with said strut.

3. In a multiplane, a fixed interwing strut forming part of the wing truss system, and a vertical axis aileron journaled to oscillate about said strut.

4. In a biplane, a fixed interwing strut of streamlined section, and a vertical axis aileron having an axis member coextensive with and streamlined by said strut.

5. In an airplane, principal supporting surfaces, and a vertical axis aileron mounted substantially in the horizontal plane to revolve about an axis passing substantially through its longitudinal center of pressure line but to one side of its transverse center of pressure line with an effective surface on each side of said latter line.

6. In an airplane, a vertical axis aileron mounted to revolve about an axis passing substantially through its longitudinal center of pressure line but to one side of its transverse center of pressure line, together with a fixed strut in the vicinity of said axis and which pierces the body of the aileron.

7. In an airplane having superposed wings, spacing struts and interconnecting diagonally extending intersecting cables constituting the interwing trussing system, and a vertical axis aileron lying substantially in the horizontal plane passing through the intersection of certain of said cables which aileron comprehends one of said interwing struts within its perimeter.

8. In an airplane having superposed wings, a fixed spacing strut having its ends founded respectively on the wings and a vertical axis aileron having its axis journaled at points adjacent to the foundations of said strut.

9. In an aeroplane, superposed main planes, interplane struts constituting a part of the interplane trussing system, and a vertical axis aileron arranged to oscillate about one of said struts.

10. In an aeroplane superposed planes, interplane struts having truss wires connected to points at their extremities and with the truss wires forming the trussing system of the aeroplane, and vertical axis ailerons journaled to oscillate about certain of said struts.

11. In an aeroplane, superposed principal supporting planes, an interwing strut of streamline section and a vertical axis aileron journaled to oscillate about said strut.

12. In an aeroplane, superposed principal supporting planes, coextensive adjoining strut members interconnecting said planes, one of which strut members is fixed and the other of which is oscillatable about a longitudinal axis, and a vertical axis aileron carried by the latter.

13. In an aeroplane, superposed principal supporting planes, coextensive adjoining strut members interconnecting said planes, one of which is fixed and the other of which is oscillatable about a longitudinal axis, and one of which is of attenuated streamlined section, and a vertical axis aileron carried by the oscillatable strut.

In testimony whereof I hereunto affix my signature.

JOHN P. TARBOX.